United States Patent
Niwa et al.

(10) Patent No.: US 7,202,932 B2
(45) Date of Patent: Apr. 10, 2007

(54) LIQUID CRYSTAL DISPLAY AND METHOD FOR MANUFACTURING LIQUID CRYSTAL DISPLAY

(75) Inventors: Hiroshi Niwa, Yokohama (JP); Hidefumi Yamashita, Kanagawa-ken (JP); Tatsushi Koike, Kanagawa-ken (JP); Yoshiaki Ohbayashi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 09/767,588

(22) Filed: Jan. 23, 2001

(65) Prior Publication Data

US 2001/0033357 A1 Oct. 25, 2001

(30) Foreign Application Priority Data

Apr. 20, 2000 (JP) .............................. 2000-120086

(51) Int. Cl.
*G02F 1/1339* (2006.01)
*G02F 1/1341* (2006.01)

(52) U.S. Cl. ..................... 349/154; 349/189; 349/190

(58) Field of Classification Search ........ 349/153–154, 349/192, 189, 190
See application file for complete search history.

(56) References Cited

U.S. PATENT DOCUMENTS

| | | | | |
|---|---|---|---|---|
| 4,820,025 A | * | 4/1989 | Nakanowatari | 349/154 |
| 5,798,813 A | * | 8/1998 | Ohashi et al. | 349/154 |
| 5,936,695 A | * | 8/1999 | Hida et al. | 349/153 |
| 6,304,308 B1 | * | 10/2001 | Saito et al. | 349/155 |
| 6,320,638 B1 | * | 11/2001 | Youn | 349/154 |
| 6,665,040 B2 | * | 12/2003 | Youn | 349/153 |

\* cited by examiner

*Primary Examiner*—Toan Ton
(74) *Attorney, Agent, or Firm*—F. Chau & Associates LLC

(57) ABSTRACT

A liquid crystal display comprises an injection hole post structures compatible with liquid crystal formed in an area near an injection hole to prevent pollutants seeped from an end-sealing material from penetrating into a display area, thereby suppressing the deterioration of picture quality in the display area. The liquid crystal display comprises a first substrate and a second substrate having a predetermined gap therebetween. Liquid crystal is sealed in the gap. The liquid crystal display comprises post structures for controlling the gap, and a sealing material provided outside the display area for sealing the liquid crystal in the gap, and forming the open injection hole for injecting the liquid crystal therethrough. The end-sealing material seals the injection hole after the liquid crystal is sealed. Injection hole post structures are provided in the area near the injection hole, for dividing the injection hole into a plurality of portions.

7 Claims, 7 Drawing Sheets

FIGURE 3

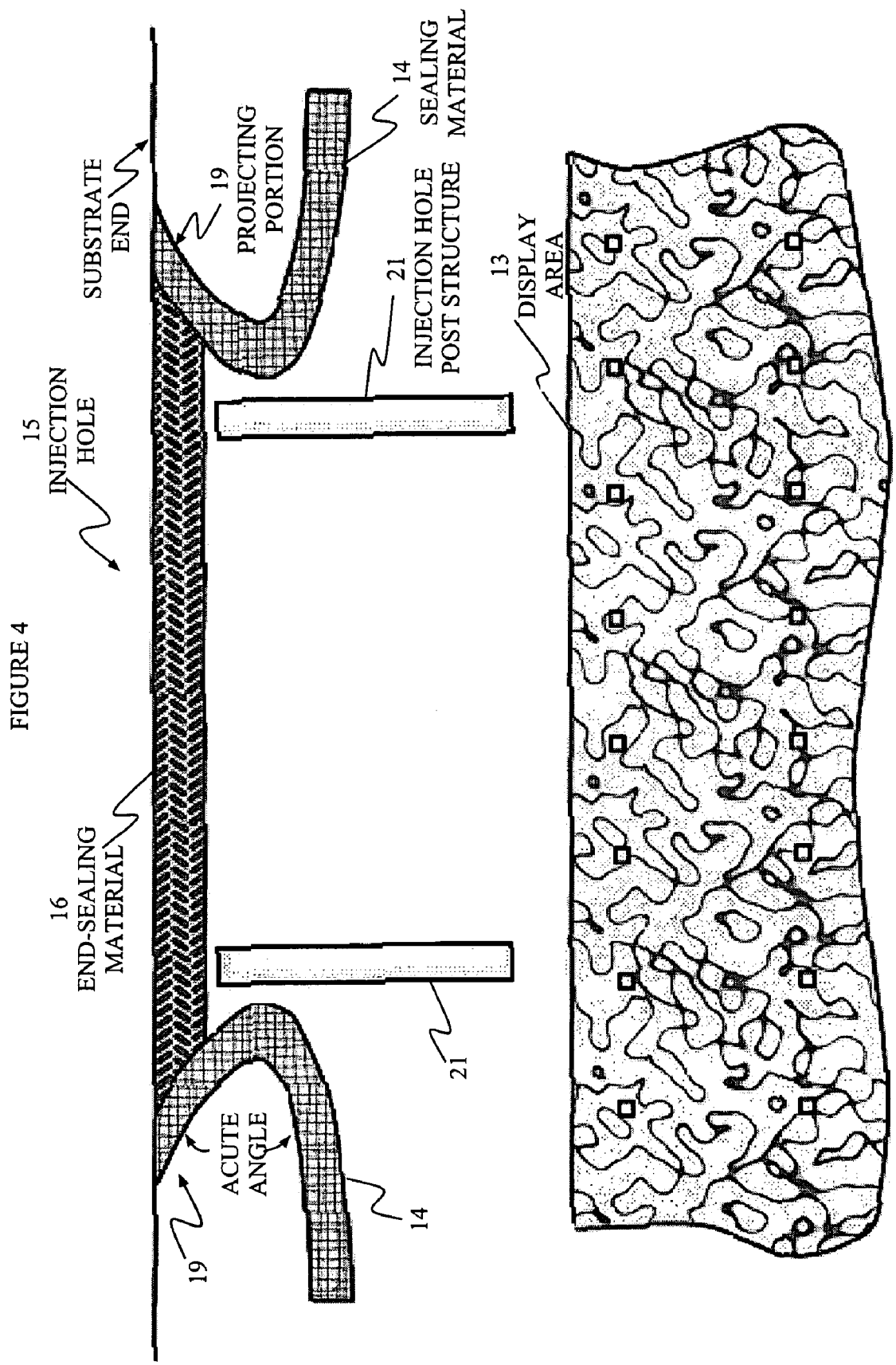

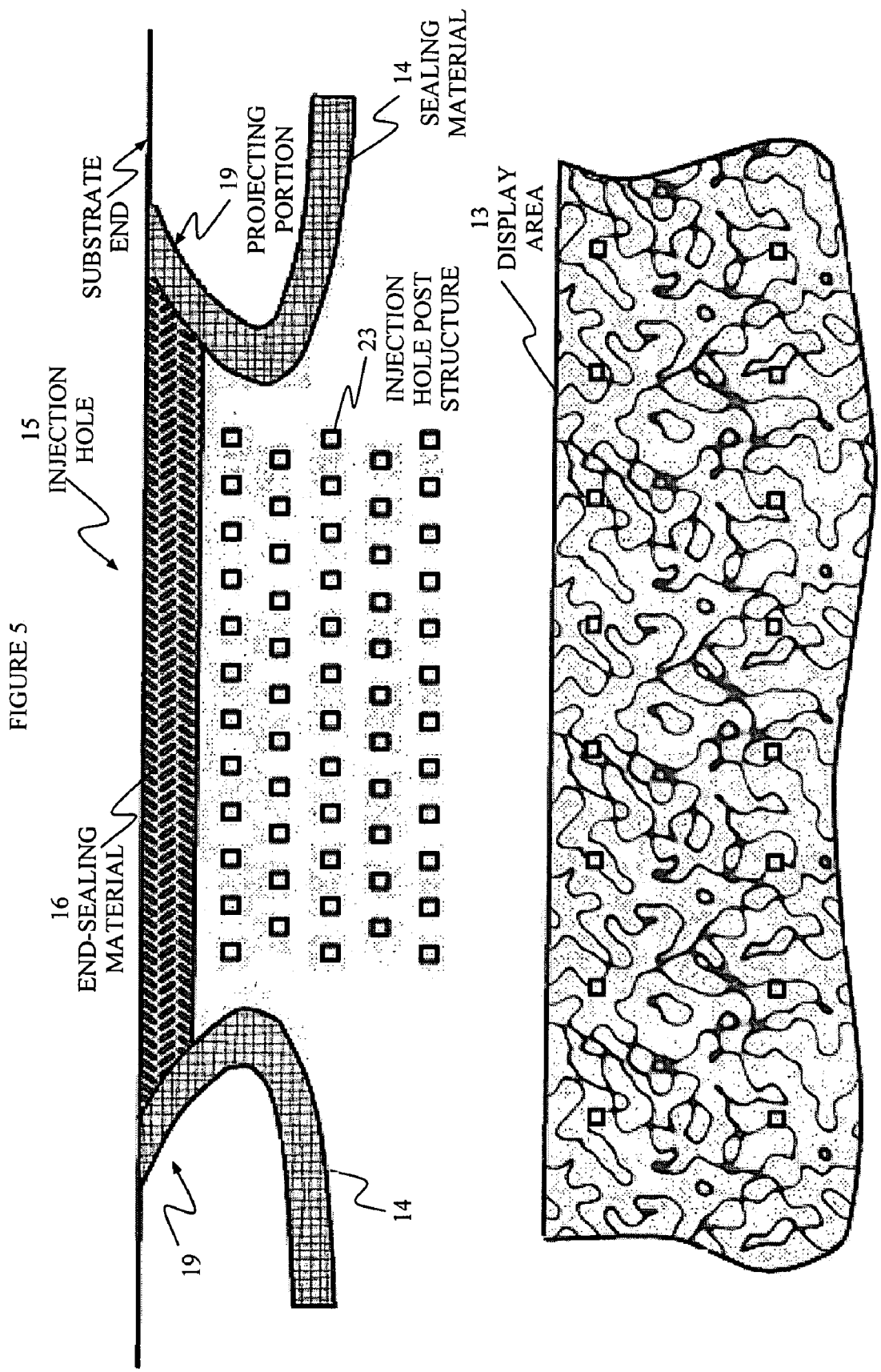

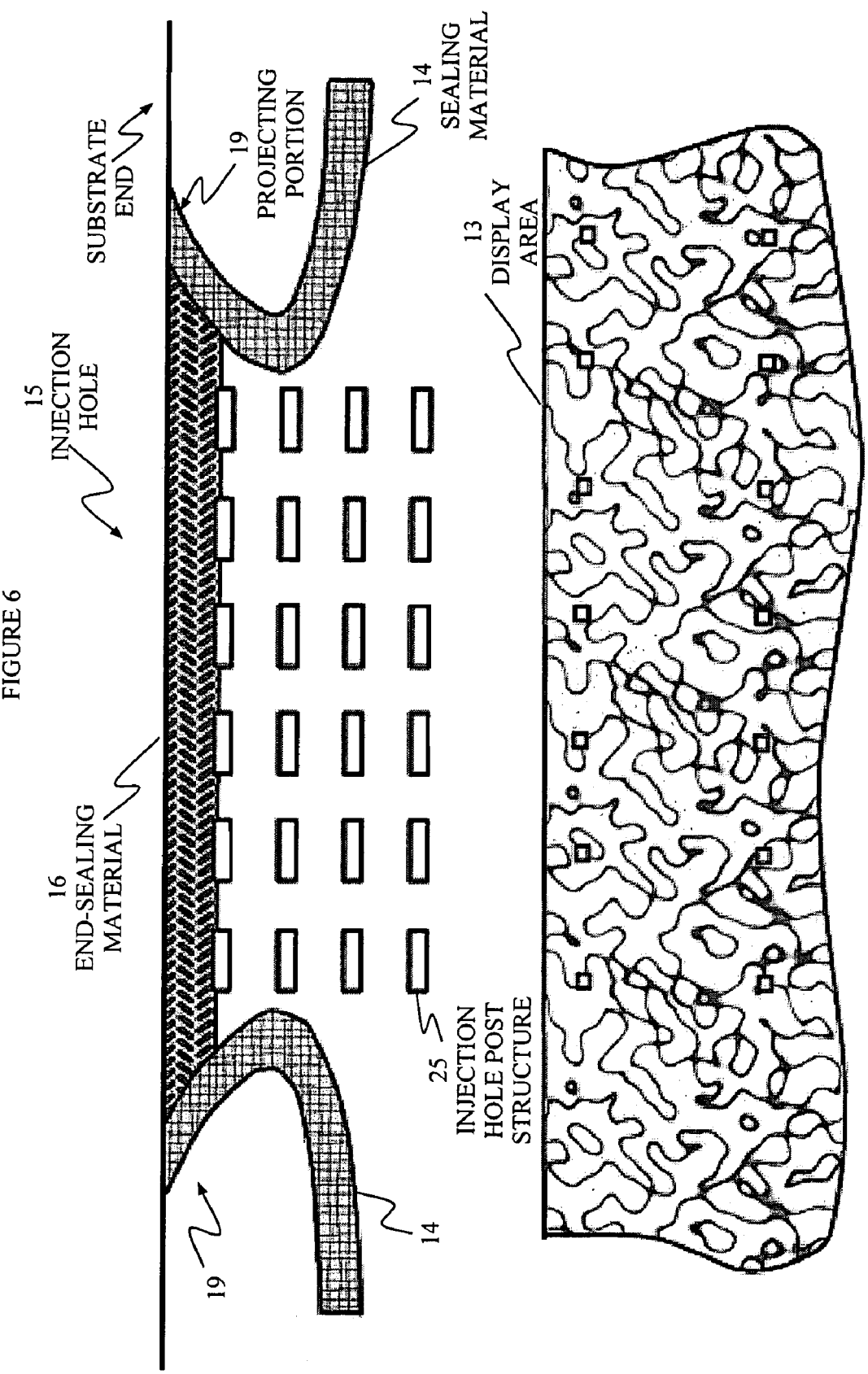

RESIST COATING

PATTERNING OF POST STRUCTURES AND
INJECTION HOLE POST STRUCTURES

SEALING MATERIAL COATING

ASSEMBLING

INJECTION OF LIQUID CRYSTAL

SEALING

LIQUID CRYSTAL DISPLAY AND METHOD FOR MANUFACTURING LIQUID CRYSTAL DISPLAY

BACKGROUND OF THE INVENTION

1. Technical Field

The present invention relates to a liquid crystal display, and in particular to a liquid crystal display which comprises a sealing material for sealing the peripheral portion in two substrates, and an end-sealing material for sealing the injection hole for liquid crystal, and a method for manufacturing such a liquid crystal display.

2. Discussion of Related Art

In an active matrix liquid crystal display (LCD) using thin film transistors, liquid crystal is sealed between a TFT array substrate, which has gate electrodes (Y-electrodes) and data electrodes (x-electrodes) arranged in a matrix and has thin film transistors (TFT) placed at the intersection points of them and an opposing substrate overlaid with a gap between the TFT array substrate, and the voltage applied to the liquid crystal is controlled by the thin film transistors to enable display by using the electrooptic effect of the liquid crystal.

To seal liquid crystal between two substrates of glass or the like, and protect the liquid crystal from external pollution such as moisture or environmental change, a sealing material is generally used. The sealing material is made of a thermosetting resin or an ultraviolet-curing resin, and it is formed in the peripheral portion of one substrate using screen printing or a writing method by dispenser. After placing the other substrate on one substrate on which the sealing material is formed, they are pressed and heated to a fixed degree, and if the sealing material is an ultraviolet-curing resin, it is cured by ultraviolet rays, thereby to bond the two substrates by means of the sealing material. For the sealing material, high mechanical bonding strength and high stability to change in environment such as temperature or moisture, as well as low curing temperature and no pollution of the liquid crystal by the curing agent are required as its characteristics. Further, in part of the sealing material, there is provided an opening, which is an injection hole for injection of the liquid crystal.

After the two substrates are bonded together by the sealing material, the closed area formed by the sealing material is evacuated, and the liquid crystal is injected from the injection hole. Thereafter, as the end-sealing material, an ultraviolet-curing resin is charged, and exposed to UV rays to seal the liquid crystal.

As solutions to various problems occurring in the injection of the liquid crystal, there are Published Unexamined Patent Applications No. 6-34984, 9-90330, and 61-45225. In the Published Unexamined Patent Application No. 6-34984, there is disclosed a technique for suppressing the velocity of liquid crystal by providing a protrusion and a wall in the injection hole, thereby to prevent damage of the alignment layer due to the movement of spacers. Further, in the Published Unexamined Patent Application No. 9-90380, there is disclosed a technique for doubly sealing the liquid crystal cell (LCD cell) by providing a second horn, which is a member for preventing the mixing of air outside the injection hole horn, thereby to prevent the external mixing of air by air bubbles. Furthermore, in the Published Unexamined Patent Application No. 61-45225, there is disclosed a technique in which a gap control material of the same material as the sealing material is provided inside the injection hole to divide the injection hole into a plurality of portions for stabilizing the amount of penetration of the end-sealing material when the injection hole is sealed, thereby to increase the reliability.

Although the injection hole of the LCD cell formed from a sealing material and end-sealing material of a UV-curing resin is employed, as described above, the end-sealing material and liquid crystal essentially are not compatible, and in particular, if they are used under elevated temperature and humid conditions, the charge retention of the liquid crystal deteriorates from the injection hole, and a picture quality problem such as white smear easily occurs. Generally, the mutual solubility of the sealing material with liquid crystal is also poor, and especially because the end-sealing material contacts with liquid crystal before it is cured, the pollution problem of liquid crystal is serious. The white smear is, for instance, a picture quality defect in which, in the normally white mode in which the liquid crystal becomes black when applied with a voltage, it remains white even if applied with a voltage.

However, in each publication described above, no reference is made to the problems with picture quality defects such as white smear. Further, for instance, the construction of a gap control member of the same material as the sealing material provided in the injection hole according to Published Unexamined Patent Applications No. 61-45225 is also effective to some degree against seepage of the pollution from the end-sealing material, but the sealing material is not compatible with liquid crystal as described above, and the sealing material itself as a gap control member may possibly pollute the liquid crystal. In addition, to reduce the contact area between the end-sealing material and the liquid crystal, it is possible to decrease the width of the injection hole, but it cannot be made small so much because of the pattern precision (position, width) of the sealing material. Even if the injection hole width can be made small, the increase in the liquid crystal injection time causes poor productivity and thus it lacks of feasibility. Further, it is possible to reduce the penetration of a pollutant by adversely affecting the mutual solubility between the liquid crystal and the end-sealing material, but this approach of deteriorating the mutual solubility has limitations by itself, if consideration is made to the adhesive power between glass and the end-sealing material in the sealed portion.

Further, a sufficient boding strength is kept between the sealing material and the glass substrate, or between the end-sealing material and the glass substrate, and there are less problems with the penetration of external impurities after the bonding. On the other hand, in the injection hole, the sealing material and the end-sealing material are bonded together to seal the liquid crystal, but the sealing material and the end-sealing material are both chemical materials, and the adhesiveness is not always sufficient. Further, if these are used under elevated temperature and humid conditions, they may cause a chemical reaction to emanate a pollutant from the bonded portion. Moreover, the water permeability in the bonded portion becomes high and the characteristics of the liquid crystal are easily deteriorated. The penetration of polluted liquid crystal from the bonded portion between the sealing material and the end-sealing material causes a picture quality defect such as white smear to easily occur.

The present invention was made to solve such technical problems, and its object is to prevent a pollutant seeped from the end-sealing material or the sealing material near the injection hole from penetrating into the pixel area, thereby to suppress the occurrence of a picture quality defect which is easily caused in the injection hole.

Further, another object is to reduce the contact area between the end-sealing material, which very likely deteriorates the liquid crystal, and the liquid crystal, by placing post structures in contact with or near the end-sealing material.

Still another object is to suppress the penetration of a pollutant seeped from the contact portion between the end-sealing material and the sealing material from penetrating into the pixel area.

SUMMARY OF THE INVENTION

With such objects, the present invention forms post structures of, for instance, a resin compatible with liquid crystal in an area near the injection hole to prevent the pollutant seeped from the end-sealing material and the sealing material from penetrating into the pixel area (display area), thereby suppressing the occurrence of a picture quality trouble which often appears in the pixel area near the injection hole. That is, the present invention is a liquid crystal display having a first substrate and a second substrate which are disposed with a predetermined gap therebetween, and having liquid crystal sealed in the gap, the liquid crystal display comprising post structures for controlling the gap between the first substrate and the second substrate, a sealing material provided outside the display area for sealing the liquid crystal in the gap, and forming an open injection hole for injecting the liquid crystal through it, an end-sealing material for sealing the injection hole after the liquid crystal is sealed in, and injection hole post structures provided in the area near the injection hole, for dividing the injection hole into a plurality of portions by using the same material as the post structures.

Since the injection hole post structures are characterized by dividing the width of the injection hole into 100 m to 3 mm, the pollutant penetrating from each divided area cannot easily expand, and thus it is preferred in the point that the pollutant can be prevented from reaching the display area.

Further, since the injection hole post structures are characterized in that they are formed with a height lower than the height of the gap formed by the first substrate and the second substrate, it is possible to allow the pollutant of a relatively high viscosity to penetrate into the space formed to block it.

Furthermore, since the injection hole post structures are characterized in that they are formed from a material which cannot easily degrade the charge retention of the liquid crystal as compared with the sealing material, it is excellent in the point of having less effect on the pixel area as compared with the one in which the injection hole post structures are formed from the same material as the sealing agent, because the sealing material itself is not so compatible with the liquid crystal in general.

Moreover, since the injection hole post structures are characterized in that they are formed at a position where part of them is in contact with the end-sealing material, the contact area between the liquid crystal and the end-sealing material can be reduced, and thus it is preferred in the point that the occurrence of a pollutant can be suppressed.

From another viewpoint, the liquid crystal display to which the present invention is applied is characterized by comprising a sealing material for connecting a pair of substrates outside the display area, and forming an open injection hole for injecting liquid crystal, an end-sealing material for sealing the injection hole after the liquid crystal is injected, and penetration suppressing means provided near the connection portion between the sealing material and the end-sealing material for suppressing the penetration of a pollutant generated from the connection portion into the display area.

If the sealing material is characterized by having a projecting portion formed by bending the sealing material at an acute angle when the injection hole is formed, it is preferred in the point that the contact area between the sealing material and the end-sealing material can be increased to enhance the bonding strength.

Further, the penetration suppressing means may be characterized in that it is a pair of post structures which is close to the projecting portion and extending from the vicinity of the substrate end in the injection hole to the display area. Furthermore, the penetration suppressing means may be formed from projections or the like which are respectively provided on each of the pair of substrates.

Further, the present invention is a liquid crystal display in which liquid crystal is sealed in the gap formed by a pair of substrates to display pictures on a display area, characterized by comprising post members formed, after a pattern, on one substrate forming the pair of substrates for controlling the gap, a sealing material provided outside the display area for sealing the liquid crystal in the gap, and forming an open injection hole for injecting the liquid crystal through it, and an end-sealing material for sealing the injection hole after the liquid crystal is sealed in, and a plurality of injection hole post structures provided between the substrate end in the injection hole and the display area on one substrate, and formed after a pattern similarly to the post members, for preventing the pollutant seeped from the end-sealing material from penetrating into the display area.

The plurality of injection hole post structures can be characterized by forming injection hole post structures of a plurality of rows toward the display area from a position close to the substrate end in the injection hole.

Further, if those of the injection hole post structures forming the plurality of rows that are close to the substrate end in the injection hole are characterized in that they are disposed at the position where they are in contact with the end-sealing material, the contact area between the liquid crystal and the end-sealing material can be reduced.

Furthermore, the present invention can be characterized by comprising a plurality of injection hole post structures provided in an area near the injection hole at a distance D from the display area, and respectively disposed with a predetermined space between them, in which the predetermined space formed by the plurality of injection hole post structures is shorter than double the distance D. In general, a picture quality defect propagates along the substrate and expands circularly (semicircularly) from the space of the plurality of injection hole post structures. If the predetermined space is made double the distance D, a picture quality defect can occur in a semicircle the radius of which is the distance D, thereby likely reaching the display area. Thus, if such predetermined space is made shorter than double the distance D, it is preferred in the point that the picture quality defect can be prevented from reaching the display area.

On the other hand, in the method for manufacturing a liquid crystal display to which the present invention is applied, the post members making up the post structures for controlling the cell gap and the injection hole post structures for preventing the penetration of the pollutant seeped from the end-sealing material or the like are formed in the same patterning step. That is, it is characterized by comprising: a post structure forming step of applying a resin to a first substrate, and using the resin to form, after a pattern, post members for controlling the cell gap between a second substrate opposing to the first substrate, and injection hole post structures provided in the vicinity of the injection hole for liquid crystal; a sealing material applying step of applying a sealing material surrounding the outside of the display area in the first substrate and forming the injection hole; a bonding step of disposing and pressing the opposing second substrate against the first substrate applied with the sealing material, thereby to bond the first substrate and the second substrate by means of the sealing material; a liquid crystal injecting step of injecting liquid crystal from the injection hole into gap between the first substrate and the second substrate bonded each other; and an end-sealing material charging step of charging an end-sealing material for sealing the injection hole.

If the sealing material applying step is characterized in that the sealing material is applied at a position where it is not in contact with the injection hole post structures formed after a pattern by the post structure forming step, it is possible to avoid the problem that the gelated sealing material climbs up the injection hole post structure and the cell gap cannot be controlled. However, it is no problem that the sealing material contacts with the injection hole post structures after gelated.

Further, if the post structure forming step is characterized in that a photosensitive resin is applied to the first substrate, and the resin is hardened after exposed to UV rays using a photomask, then the post members and the injection hole post structures can be generated with good accuracy, and it is possible to deal with the problem of producing a pollutant to the display area.

BRIEF DESCRIPTION OF THE DRAWINGS

FIG. 3 is a graph showing the result of a reliability test in the liquid crystal cell (LCD cell);

FIG. 4 is an illustration of the construction of the area near the injection hole of a liquid crystal display in accordance with a second embodiment of the present invention;

FIG. 5 shows another construction of the area near the injection hole of a liquid crystal display in accordance with the present invention;

FIG. 6 shows still another construction of the area near the injection hole of a liquid crystal display in accordance with the present invention.

DETAILED DESCRIPTION OF PREFERRED EMBODIMENTS

Embodiment 1

Figure 1:
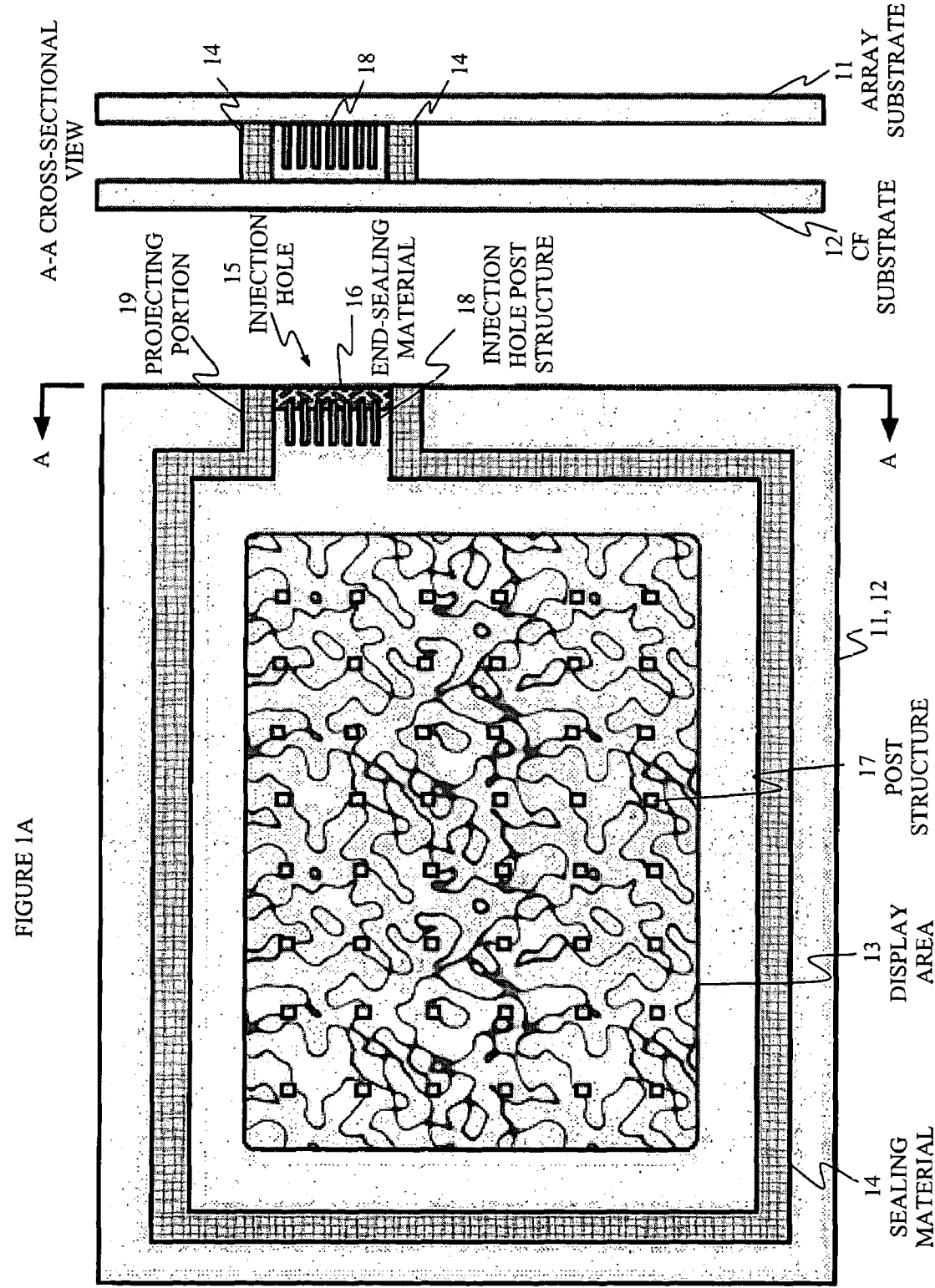
FIGS. 1 (a) and (b) illustrate an exemplary construction of the liquid crystal display according to an embodiment of the present invention.

Now, this invention is described in detail according to the embodiments shown in the accompanying drawings. A description of the legends in the drawings follows:
11 . . . Array substrate
12 . . . CF substrate
13 . . . Display area
14 . . . Sealing material
15 . . . Injection hole
16 . . . End-sealing material
17 . . . Post structure
18 . . . Injection hole post structure
19 . . . Projecting portion
21 . . . Injection hole post structure
23 . . . Injection hole post structure
25 . . . Injection hole post structure
30 . . . Ultraviolet-curing resin
31 . . . Post member
32 . . . Opposing post member FIGS. 1 (a) and (b) are figures for explaining the whole construction of the liquid crystal display in accordance with a preferred embodiment of the present invention. FIG. 1 (a) is a plan view, and FIG. 1 (b) is an A—A cross-sectional view including the area near an injection hole 15. Symbol 11 is an array substrate that is the first substrate, on which thin film transistors (TFTs), display electrodes, and alignment layers are formed. In this embodiment, considering the downsizing of the device, the construction is based on the so-called narrow picture frame design, in which the edge between a display area 13 and the array substrate 11 is very narrow, 3 mm or less. On the other hand, symbol 12 is a CF substrate that is a second substrate, and on the rear of the CF substrate 12, black matrix, color filters, opposing electrodes ITO, and alignment layers are formed.

Further, around the array substrate 11, a sealing material 14 is formed in the shape of a picture frame to surround the display area 13 of the array substrate 11. Furthermore, in part of the sealing material 14, there is provided an open injection hole 15. The injection hole 15 is constructed so that the sealing material 14 is made to project a little toward the end portion of the array substrate 11 from the sealing material 14 forming area to form a projecting portion 19 and make an opening. In this embodiment, there is a construction in which the sealing material 14 is provided on the array substrate 11 and the CF substrate 12 is overlaid upon it. Further, as the sealing material 14, a thermosetting resin comprised of, for example, an epoxy resin containing a curing agent is employed, and the CF substrate 12 is overlaid upon the array substrate 11 and the sealing material 14 is cured after once gelated by pressing and heating, thereby to bring the array substrate 11 and the CF substrate 12 in intimate contact with each other. After bringing the array substrate 11 and the CF substrate 12 in close contact with each other by using the sealing material 14, liquid crystal is injected from the injection hole 15 into the gap between the two substrates, and after injecting the liquid crystal, the injection hole 15 is sealed with an end-sealing material 16 comprised of a high-purity silicone agent or the like, which is UV-curing resin.

Symbol 17 represent post structures, which are used instead of spacers for controlling the cell gap, the distance (gap) between the array substrate 11 and the CF substrate 12. The post structures 17 are formed in appropriate number on the array substrate 11 and the CF substrate 12 by a patterning, between pixels in the display area 13 actually displaying pictures, corresponding to, for instance, the position of the black matrix (not shown). More specifically, with an appropriate space between the pixels, post members which are relatively tall, but a little shorter than the cell gap (about 4.5 m) are provided on the array substrate 11 side, and on the CF substrate 12 side, opposing post members (about 0.3 m) corresponding to the positions of the post members are provided, and the cell gap (about 4.8 m) is determined by the post members and the opposing members. Further, as a variation of this, it is possible that post members (about 4.5 m) are provided on the CF substrate 12 side and the opposing post members (about 0.3 m) are provided on the array substrate 11 side.

Further, in this embodiment, as shown in FIGS. 1 (*a*) and (*b*), in the projecting portion 19 which is near the injection hole 15 and formed from the sealing material 14, that is, in the area near the injection hole 15, there are provided injection hole post structures 18 which are formed from the same material as the post members and by the same patterning step. The material of the injection hole post structures 18 is an ultraviolet-curing resin comprised of, in a component ratio of, 15–25% of acrylic, 10–20% of acrylic monomer, 1–10% of photosensitizing agent, and 55–65% of solvent. As the ultraviolet-curing resin employed for the post structures 17, which are post members, and the injection hole post structures 18, a material is selected which is compatible with liquid crystal and does not deteriorate the charge retention of the liquid crystal.

Figure 2:
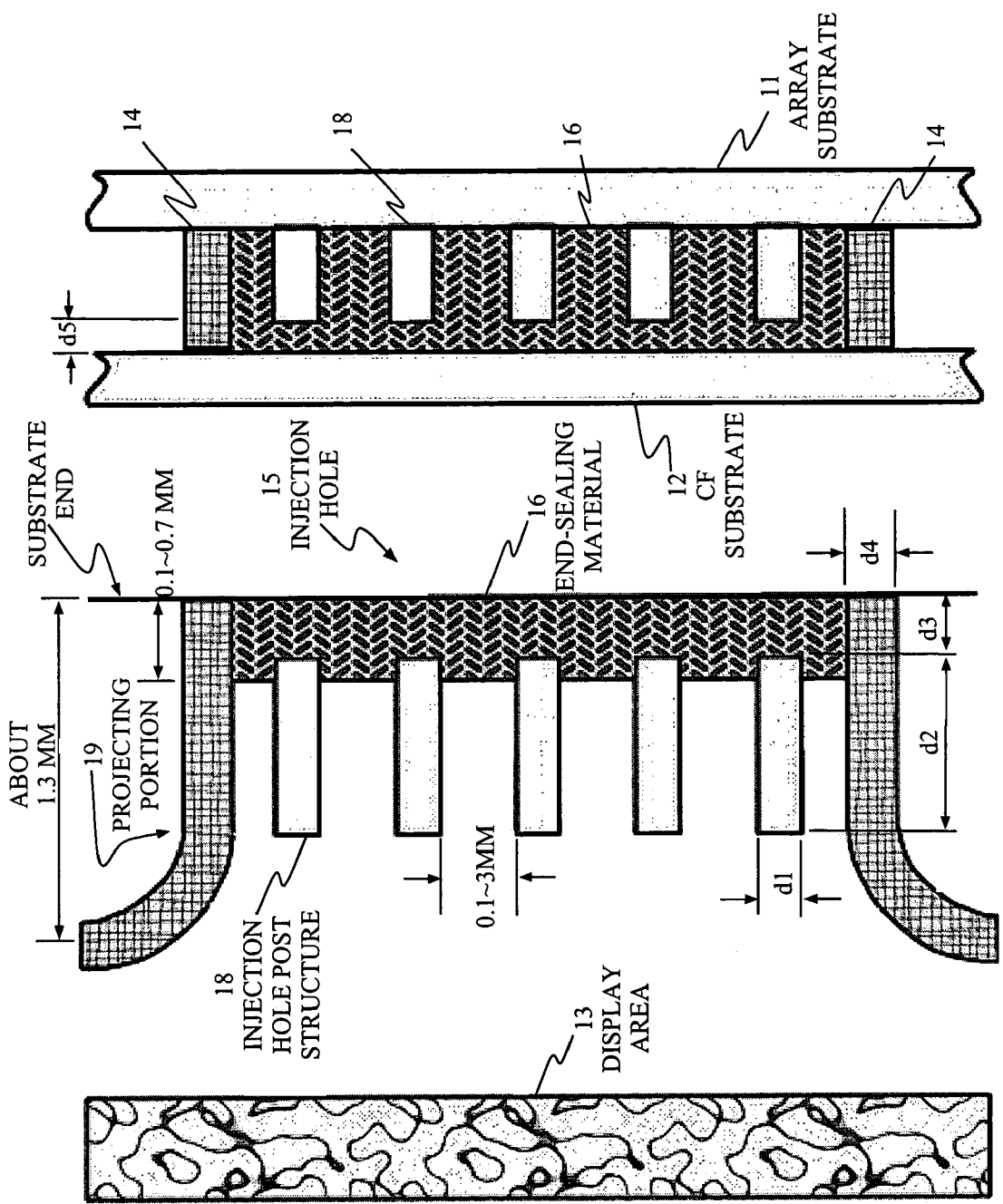
FIGS. 2 (a) and (b) are figures in which the area near the injection hole 15 shown in FIG. 1 (a) and (b) is enlarged.
Figure 7A:
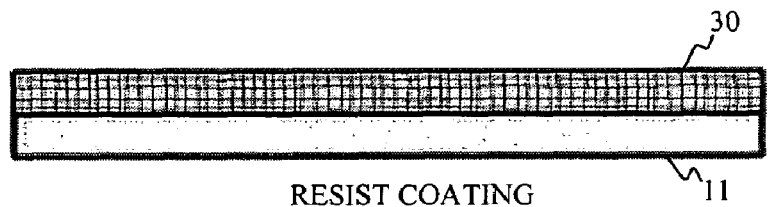
FIGS. 7 (a) to (f) illustrate a manufacturing process for a liquid crystal display according to the present invention.
Figure 7B:
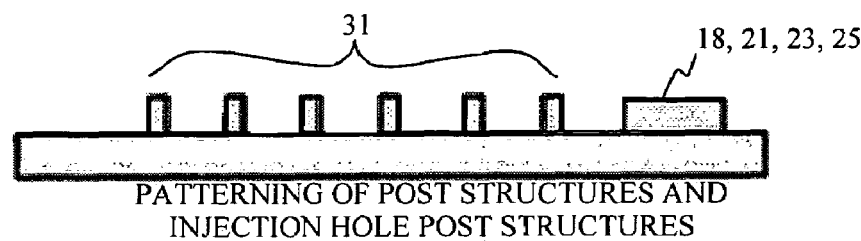
Figure 7C:
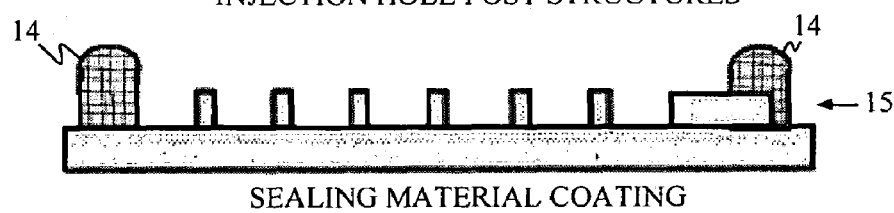
Figure 7D:
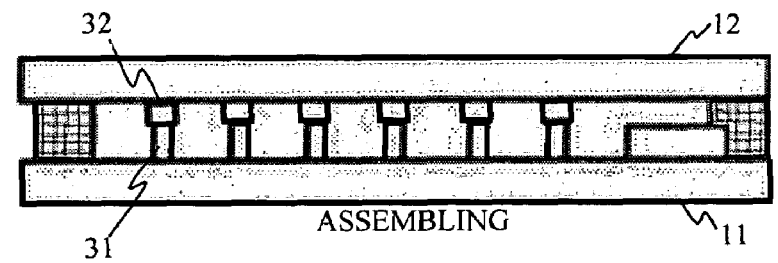
Figure 7E:
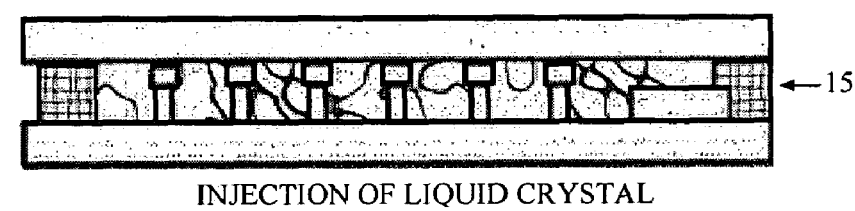
Figure 7F:

FIGS. 2 (*a*) and (*b*) are enlarged views of the area near the injection hole 15 shown in FIGS. 1 (*a*) and (*b*). FIG. 2 (*a*) is a plan view, and FIG. 2 (*b*) is a side view in which FIG. 2 (*a*) is seen from the right side. In this embodiment, the projecting portion 19 is formed so as to be projecting by about 1.3 mm from the center of the sealing material 14 to the substrate end (glass end), and in the area near the injection hole 15, the injection hole post structures 18 are used to make a plurality of injection holes of a small size from 100 m (0.1 mm) to 3 mm, which cannot be formed with the sealing material 14. That is, as shown in FIG. 2 (*a*), a plurality of injection hole post structures 18 are arranged with distance of 100 m to 3 mm therebetween. The distance was set to 100 m or larger, because a width smaller than this will make the injection resistance larger when injecting liquid crystal, which leads to a problem with the injection process. Further, it was set to 3 mm or less, because the expansion distance of the pollutant becomes longer if set to a value larger than 3 mm, and the pollutant can reach the display area 13. However, if it is larger than 3 mm, the post structures can be formed with the sealing material 14. Further, the plurality of injection hole post structures 18 are arranged so that the width d1 of them falls within the range of 5 m to the full width of the injection hole 15, and the length d2 falls in the range of 5 m to a value that ensures space of 100 m or larger from the pixel end in the display area 13. The width d1 and d2 were set to 5 m or larger, because it is considered that a patterning cannot be carried out with a value smaller than this, or it is difficult to achieve a good accuracy even if the patterning can be carried out.

Further, in this embodiment, to reduce the contact area between the liquid crystal and the sealing material 14, there is given a construction in which the plurality of injection hole post structures 18 is put in contact with the sealing material 14. For that, if the width of the sealing material 14 is assumed to be 0.1 mm to 0.7 mm, the distance d3 from the substrate end to the injection hole post structures 18 is preferably shorter than 0.1 mm. Furthermore, the distance d4 between the position at which the sealing material 14 is applied and the injection hole post structures 18 is set so that there is no contact with the position at which the sealing material 14 is applied, and that space of 0.1 mm to 3 mm can be ensured. If there is contact with the position at which the sealing material 14 is applied, the sealing material 14 can climb up the injection hole post structures 18 and the cell gap cannot be ensured when the sealing material 14 is gelated, and thus it is preferred that the injection hole post structures 18 are formed with a predetermined space from the position at which the sealing material 14 is applied. In this embodiment, the distance from the substrate end in the injection hole 15 to the display area 13 is set to about 3 mm.

Furthermore, the gap d5 between the CF substrate 12 and the injection hole post structures 18 as shown in FIG. 2 (*b*) is equal with the space of about 0.3 m between the post members (about 4.5 m) on the array substrate 11 side and the cell gap (about 4.8 m), and it is formed by not providing a structure similar to the opposing members of the post members 17 on the CF substrate 12 side in correspondence to the injection hole post structures 18. There is no problem even if the gap d5 is not provided. However, paying attention to the difference in viscosity of the injected liquid crystal (viscosity: 1 Pas or less) and the end-sealing material 16 (viscosity: 10 to 500 Pas), the liquid crystal can enter without being prevented by the gap d5 between the injection hole post structures 18 and the CF substrate 12, but an effect can be expected that the end-sealing material 16 once abuts upon the injection hole post structures 18 so as to be prevented from entering toward the display area 13. Further, the material dissolved in the end-sealing material 16 abuts upon the injection hole post structures 18 and spreads in the gap d5 by capillarity, by which the dissolved material is blocked by the injection hole post structures 18, and it can be expected that the dissolved material can be prevented from penetrating into the display area 13.

Figure 3:
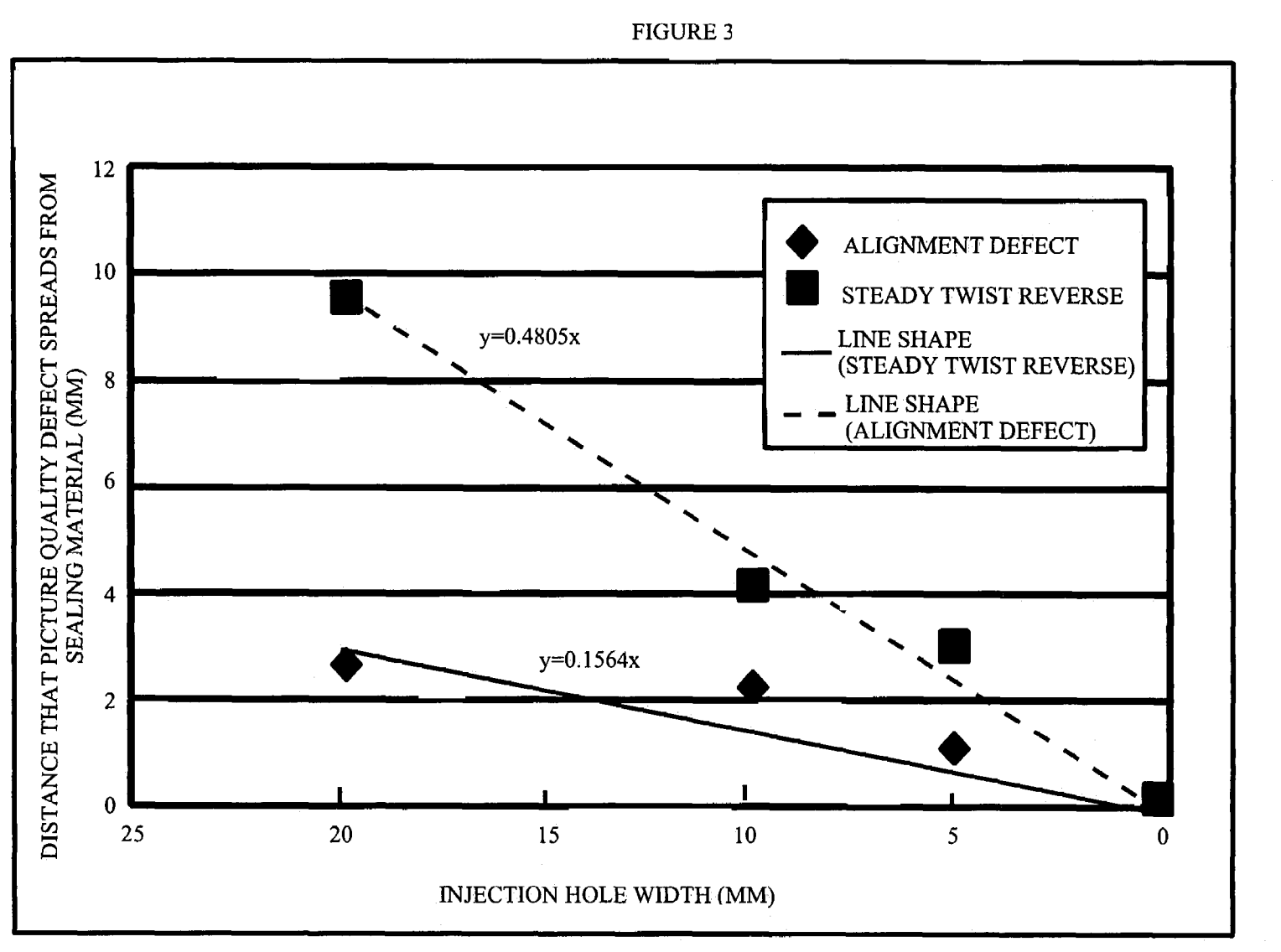

FIG. 3 is a graph showing the result of a reliability test in the liquid crystal cell (LCD cell). This shows the relationship between the injection hole width and picture quality defects for a 200-hour reliability test in a high-temperature chamber (90C). The abscissa represents the injection hole width (mm) and the ordinate represents the distance the picture quality defects spread from the end-sealing material. Further, as the picture quality defects, two types of defects, "alignment defect" in which the alignment of liquid crystal is out order, and "steady twist reverse" in which aligned liquid crystal molecules are disordered to reverse the direction of rotation of them, are taken here.

As obvious from the graph of FIG. 3, the spread distance of picture quality defect decreases as the injection hole width becomes narrower. That is, as the result of an actual measurement, the extent (range of spread) of alignment defect can be reduced to about 80% for the injection hole width of 10 mm, and about 43% for the injection hole width of 5 mm, as compared with the injection hole width of 20 mm. Further, the extent (range of spread) of steady twist reverse can be reduced to about 43% for the injection hole width of 10 mm, and about 32% for the injection hole width of 5 mm. If the injection hole of a 1 mm-sized width is formed according to a straight line approximated from the experimental result, the extent of alignment defect can be made about 0.16 mm, and the extent of steady twist reverse can be made about 0.48 mm. If a plurality of injection holes of the 1 mm-sized width is provided, the distance of picture quality defect from the end-sealing material can be suppressed to the above-mentioned extent in each injection hole, and it would be capable of fully meeting the future narrow picture frame design in the LCD cell. On the other hand, if the injection hole of a 3 mm-sized width is formed, the extent of alignment defect is about 0.47 mm, and the extent of steady twist reverse is 1.44 mm. In this embodiment, since the distance from the end (inside) of the end-sealing material 16 to the display area 13 is about 2.3 mm at minimum (3 mm–0.7mm), picture quality defects can be prevented from reaching the display area 13 by arranging the plurality of injection hole post structures 18 so as to be spaced apart from each other by 3 mm or less, as described above, allowing for formation errors or the like to some extent.

As seen from this experiment result, the distance of steady twist reverse, which is a picture quality defect, is about ½ of the injection hole width. This is because a picture quality defect propagates along the substrate and spreads circularly (semicircularly) from the space of the plurality of injection hole post structures 18. Considering this phenomenon, it can be understood that the space formed by the plurality of injection hole post structures 18 is preferably shorter than double the distance between the injection hole post structures 18 and the display area 13.

As described above, according to this embodiment, the components of the cured sealing material 14 and the end-sealing material 16 can be prevented from penetrating into the liquid crystal. Further, by making a plurality of injection holes of a small size of 100 m to 3 mm, which are difficult to form only with the sealing material 14, the contact area between the end-sealing material 16 and the liquid crystal can be reduced. This allows reduction of the amount of the end-sealing material 16 which dissolves in the liquid crystal, and an LCD cell can be provided in which picture quality defects easily occurring around the injection hole 15 are reduced. Further, as in this embodiment, if a plurality of injection holes are formed with certain space being kept between them, and the widths of the plurality of injection holes are added together to ensure the same width as the conventional injection hole width, then the injection time for liquid crystal does not become longer and no problem occurs in the process.

Embodiment 2

In the Embodiment 1, to make a plurality of injection holes of a small size of 100 m to 3 mm, the plurality of injection hole post structures 18 spaced apart from each other by a predetermined space are disposed in the injection hole 15. In this embodiment, injection hole post structures are provided near the sealing material 14 of the injection hole 15 formed with the sealing material 14.

For constructions similar to the Embodiment 1, similar symbols are used, and the detailed description of them is omitted.

FIG. 4 is a figure for explaining the construction of the area near the injection hole 15 of the liquid crystal display in the Embodiment 2. In this embodiment, the projecting portions 19 of the sealing material 14 is bent at an acute angle to form the injection hole 15. Further, in the vicinity of the bent portions of the sealing material 14, (at two positions), injection hole post structures 21 are provided. The injection hole post structures 21 may be constructed so as to be spaced apart from the end-sealing material 16 as shown, or in contact with it. It is similar to the Embodiment 1 in the point that the contact area between the end-sealing material 16 and the liquid crystal can be reduced if the injection hole post structures 21 are put in contact with the end-sealing material 16. Further, the material, shape, and manufacturing method of it are similar to the injection hole post structures 18 of the Embodiment 1. In this case, the injection hole post structures 21 are arranged adjacently to the projecting portions 19 of the sealing material 14, and they are arranged so that the injection hole post structures 21 do not contact with the sealing material 14 when the sealing material 14 is applied to the array substrate prior to the gelation of the sealing material 14. The reason for this is that, if they are brought in contact with the sealing material 14, the sealing material 14 may climb up the injection hole post structures 21 when the sealing material 14 gelated, and the cell gap cannot be ensured. However, this is not intended to inhibit contact after the gelation.

Further, this embodiment is constructed so that, by bending the projecting portions 19 of the sealing material 14 at an acute angle, the contact area between the sealing material 14 and the end-sealing material 16 is increased when the end-sealing material 16 is charged. In general, the bonding strength between the sealing material 14 and the glass substrate (array substrate 11 or CF substrate 12), or between the end-sealing material 16 and the glass substrate (array substrate 11 or CF substrate), and the reduction in the bonding strength due to moisture absorption and the water permeability from the bonding surface can be kept low. However, the sealing material 14 and the end-sealing material 16, which are both chemical materials, make no good contact, and water penetration or the like easily occurs through such contact portion. In this embodiment, the contact area between the sealing material 14 and the end-sealing material 16 is increased to allow for the suppression of the occurrence of such problem.

However, even with the above construction, the problem of impurity penetration from the contact area between the sealing material 14 and the end-sealing material 16 cannot completely be solved. Thus, in this embodiment, the injection hole post structures 21 are provided near the sealing material 14 to prevent the liquid crystal deteriorated in charge retention from penetrating and reaching the display area 13. The liquid crystal deteriorated in charge retention, which appears from the contact area between the sealing material 14 and the end-sealing material 16, is controlled by the injection hole post structures 21 as a penetration suppressing means, and also clings to the injection hole post structures 21 so as to be prevented from spreading, so that a trouble such as white smear can be suppressed even for the use under a severe environment such as high temperature and humid condition. Using samples (three units) in this embodiment and samples (three units) to which the above countermeasure was not applied, the inventors carried out a reliability test under a high temperature and humid atmosphere of 70 C., 80%. As a result of the test, in all the three units to which the countermeasure was not applied, picture quality defects occurred in 200 hours after starting the test, whereas in the three units for which the above construction was employed, no picture quality defect occurred in any of the three, assuring the advantage of this construction. Furthermore, according to the construction in which the injection hole post structures 21 are provided near the sealing material 14 to prevent the liquid crystal deteriorated in charge retention from penetrating and reaching the display area 13, a significant effect can be obtained even if the projecting portions 19 of the sealing material 14 are not bent at an acute angle.

As described above, in accordance with this embodiment, by arranging the injection hole post structures 21 having a predetermined size near the sealing material 14 in the injection hole 15, the liquid crystal having deteriorated charge retention due to impurities penetrating from the contact portion between the sealing material 14 and the end-sealing material 16 can be prevented from reaching the display area 13. Further, by bending the sealing material 14 forming the injection hole 15 at an acute angle to form the projecting portions 19, the contact area between the end-sealing material 16 can be increased to suppress the penetration of impurities. By these, the picture quality defects such as white smear, which has been a problem up to the present, can be prevented in advance. In addition, as a secondary effect, the width of the injection hole 15 can be accurately determined by two injection hole post structures 21 in this embodiment, whereas it is generally difficult to accurately determine the position at which the sealing material 14 is formed. Further, in this embodiment, although the two injection hole post structures 21 are provided as penetration suppressing means, a similar effect can be expected by providing, for instance, projections or the like rather than post structures on the array substrate 11 and/or the CF substrate 12.

Embodiment 3

In the Embodiment 1, to make a plurality of small-sized injection holes, the plurality of injection hole post structures 18 spaced apart from each other by a predetermined space are disposed in the injection hole 15. In this embodiment, the pollutant by the end-sealing material 16 into the liquid crystal is directly blocked by injection hole post structures, thereby to prevent picture quality defects such as white smear.

Similar symbols are used for constructions similar to the Embodiments 1 and 2, and the detailed description of them is omitted.

FIGS. 5 and 6 are figures for explaining the construction of the area near the injection hole 15 of the liquid crystal display in the Embodiment 3. In FIG. 5, in the area near the injection hole 15, a plurality of injection hole post structures 23 shaped in a rectangle such as a square are staggered in a plurality of rows toward the display area 13 from the substrate end. The material, manufacturing method, and shape (height) of each injection hole post structure 23 are similar to each injection hole post structure 18 in the Embodiment 1. Further, it is similar to the Embodiment 2 in the point that the projecting portions 19 of the sealing material 14 are bent at an acute angle to increase the connection area between the end-sealing material 16 and the sealing material 14.

On the other hand, in FIG. 6, in the area near the injection hole 15, a plurality of injection hole post structures 25 shaped in a rectangle are disposed in a plurality of rows so that each long side is substantially in parallel with the substrate end. The material, manufacturing method, and shape (height) of each injection hole post structure 25 is also similar to the injection hole post structures 18 in the Embodiment 1. Further, it is also similar to the Embodiment 2 in the point that the projecting portions 19 of the sealing material 14 are bent at an acute angle to increase the connection area between the end-sealing material 16 and the sealing material 14. Moreover, in FIG. 6, when the end-sealing material 16 is charged, the injection hole post structures 25 are brought in contact with it to decrease the contact area between the end-sealing material 16 and the liquid crystal.

In accordance with the Embodiment 3 shown in FIGS. 5 and 6, differently from the method in which a plurality of small-sized injection holes are made as in the Embodiment 1, the pollutant is directly prevented from penetrating in the pixel area (display area 13) by the injection hole post structures 23 and 25. This enables picture quality defects such as white smear to be prevented. Further, since the connection area between the end-sealing material 16 and the sealing material 14 is increased to enhance the bonding strength as in the Embodiment 2, the penetration of external impurities from the contact portion can be suppressed. Furthermore, if a construction is given in which the end-sealing material 16 and the injection hole post structures 25 are brought in contact with each other, the contact area between the end-sealing material 16 and the liquid crystal can be reduced to decrease the amount of the end-sealing material 16 which dissolves in the liquid crystal.

Now, the method for manufacturing the liquid crystal displays in the Embodiments 1 to 3 is described.

FIGS. 7 (*a*) to (*f*) are to explain the manufacturing method for the liquid crystal displays in the Embodiments 1 to 3. In this case, description is made to an example in which the post structures 17 and the injection hole post structures 18, 21, 23, and 25 are applied to the array substrate 11, though they may be applied to the CF substrate 12 as described above.

First, FIG. 7 (*a*) is a resist coating step, in which the array substrate 11 made of a glass substrate is coated with an ultraviolet-curing resin 30 made up of photosensitive acrylic resin to a film thickness of about 5 m (resist coating). Depending on the structure of the CF substrate 12, a polyimide resin is used instead of the acrylic resin.

Then, the process enters the patterning step, as shown in FIG. 7 (*b*), for forming the post members 31, post structures 17, and injection hole post structures 18, 21, 23, and 25. In the patterning step, first, a photomask is used to carry out a UV exposure, and with this UV exposure, the basic structure can be obtained by a negative method in which the portions exposed to light are cured. Of course, the basic structures can also be obtained by a positive method in the UV exposure. Thereafter, an alkali development is carried out to remove the portions which are not cured, and the structure is washed with water and dried, and the cured resin is baked at about 230 C. By the baking, the resin forming the post members 31 and injection hole post structures 18, 21, 23, and 25 is fully hardened. After forming the post members 31 and injection hole post structures 18, 21, 23, and 25 which have a height of about 4.5 m, a polyimide alignment layer is coated. The alignment layer coating is carried out after forming the post members 31 and injection hole post structures 18, 21, 23, and 25, because the alignment is put out of order if the resist step is carried out after coating the alignment layer.

Then, the step of coating the sealing material 14 shown in FIG. 7 (*c*) is entered. In this embodiment, the sealing material 14 using a thermosetting resin comprised of an epoxy resin is formed in the shape of a picture frame around the post members 31 and injection hole post structures 18, 21, 23, and 25 which are formed by FIG. 7 (*b*), and the coating is performed using, for instance, the dispenser method, with some height being kept for the required cell gap. At this point, the injection hole 15 for injecting the liquid crystal later is provided.

Next, the assembling step shown in FIG. 7 (*d*) is entered. In this step, the opposing CF substrate 12 having formed thereon the opposing post members 32 and coated with the alignment layer is pressed against the array substrate 11 having formed thereon the post members 31 and the injection hole post structures 18, 21, 23, and 25 and the sealing material 14, thereby for bringing the two in intimate contact with each other. More specifically, after pressing the CF substrate 12, a pressure of nearly one ton is applied if it is a 360 mm 460 mm-substrate, and it is heated at about 150 C. By this heating, the sealing material 14 is melted and gelated, and thereafter changed to a resin cured from a liquid state by the curing reaction by the contained curing agent. This causes the sealing material 14 to closely contact with the CF substrate 12, and the array substrate 11 and the CF substrate 12, are bonded together with the cell gap determined by the above described post structures 17 consisting of the post members 31 and the opposing post members 32 being maintained.

Then, the liquid crystal injecting step shown in FIG. 7 (*e*) is entered. In this step, the sealed area formed by the sealing material 14 is evacuated, and liquid crystal is injected from the injection hole 15.

Finally, the step of charging the end-sealing material 16, as shown in FIG. 7 (*f*), is entered. As this end-sealing material 16, a UV-curing resin comprised of a mixed resin such as high-purity silicone resin, ultraviolet-curing resin, epoxy resin, or acrylic resin is used, and UV rays are irradiated to seal the injection hole 15 for liquid crystal after the coating of the end-sealing material 16, thereby completing the series of steps.

In accordance with the manufacturing method in this embodiment, the injection hole post structures 18, 21, 23, and 25 for preventing the pollutant seeped from the end-sealing material 16 and the sealing material 14 from penetrating into the pixel area can be formed in the same manufacturing process as the post members 31 making up the post structures 17 for keeping the cell gap. That is, by a patterning step similar to the post members 31, the injection hole post structures 18, 21, 23, and 25 can be formed with the same accuracy as that required in the formation of the post structures 17. Further, the resin used for the post members 31 essentially do not pollute the liquid crystal, and the injection hole post structures 18, 21, 23, and 25 manufactured by the same material as the post members 31 do not cause a fear of polluting the liquid crystal, so they are particularly effective in the prevention of pollution employed in this embodiment.

As described above, in accordance with the present invention, the pollutant seeped from the end-sealing material or sealing material near the injection hole can be prevented from penetrating into the pixel area, thereby to suppress the occurrence of picture quality defects which easily appear in the injection hole area.

What is claimed:

1. A liquid crystal display having a first substrate and a second substrate which are disposed with a predetermined gap therebetween, in which liquid crystal is sealed in said gap, comprising:

post structures for controlling the gap between said first substrate and said second substrate;

a sealing material provided outside a display area for sealing said liquid crystal in said gap, and forming an open injection hole for injecting said liquid crystal therethrough;

an end-sealing material for sealing said injection hole after said liquid crystal is sealed in; and injection hole post structures provided between projection portions of said sealing material forming said injection hole formed of the same material as said post structures, wherein said injection hole post structures are arranged in a plurality of rows and a plurality of columns.

2. The liquid crystal display according to claim 1, wherein said injection hole post structures divide the width of said injection hole into 0.1 millimeter to 3 millimeters.

3. The liquid crystal display according to claim 1, wherein said injection hole post structures are formed with a height lower than the height of the gap formed by said first substrate and said second substrate.

4. The liquid crystal display according to claim 1, wherein said injection hole post structures are formed at a position where at least one injection hole post structure is in contact with said end-sealing material.

5. The liquid crystal display according to claim 1, wherein adjacent injection hole post structures are separated by a width that is at least double a predetermined expansion distance of a pollutant from the end-sealing material, wherein a distance to the display area is greater than double the width.

6. The liquid crystal display according to claim 1, wherein said first substrate is a color filter substrate and said second substrate is an array substrate.

7. A liquid crystal display having a first substrate and a second substrate which are disposed with a predetermined gap therebetween, in which liquid crystal is sealed in said gap, comprising:

post structures for controlling the gap between said first substrate and said second substrate;

a sealing material provided outside a display area for sealing said liquid crystal in said gap, and forming an open injection hole for injecting said liquid crystal therethrough;

an end-sealing material for sealing said injection hole after said liquid crystal is sealed in; and injection hole post structures provided in an area near said injection hole and outside of the display area formed of the same material as said post structures, wherein said injection hole post structures are arranged in a plurality of rows and a plurality of columns.

* * * * *